United States Patent
Moran et al.

(10) Patent No.: US 11,673,525 B2
(45) Date of Patent: Jun. 13, 2023

(54) ONE-PIECE WOVEN OCCUPANT RESTRAINT SYSTEM

(71) Applicant: ZF Passive Safety Systems US Inc., Washington, MI (US)

(72) Inventors: Dylan Moran, Rochester Hills, MI (US); Bruce Hill, Bloomfield Hills, MI (US); Mario Vega, Chihuahua Chih (MX)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/479,234

(22) Filed: Sep. 20, 2021

(65) Prior Publication Data
US 2023/0089115 A1 Mar. 23, 2023

(51) Int. Cl.
*B60R 21/231* (2011.01)
*B60R 21/232* (2011.01)
*B60R 21/235* (2006.01)

(52) U.S. Cl.
CPC .......... *B60R 21/231* (2013.01); *B60R 21/232* (2013.01); *B60R 2021/23547* (2013.01)

(58) Field of Classification Search
CPC .......... B60R 2021/23547; B60R 2021/23542; B60R 21/231; B60R 21/235; B60R 21/232; D03D 1/02; D10B 2505/124
USPC ............................................ 280/730.2, 728.2
See application file for complete search history.

(56) References Cited

U.S. PATENT DOCUMENTS

| 8,006,999 | B2* | 8/2011 | Suemitsu | B60R 21/235 280/730.2 |
| 8,657,331 | B2* | 2/2014 | Hashizume | B60R 21/213 280/730.2 |
| 2006/0236403 | A1 | 10/2006 | Winter et al. | |
| 2007/0015425 | A1* | 1/2007 | Hill | D06N 3/14 442/76 |
| 2007/0024031 | A1* | 2/2007 | Coleman | B60R 21/217 280/730.2 |
| 2017/0355343 | A1* | 12/2017 | Oh | B60R 21/232 |
| 2018/0290618 | A1* | 10/2018 | Floersheimer | B60R 21/2334 |
| 2021/0094501 | A1* | 4/2021 | Kakimoto | B60R 21/237 |

FOREIGN PATENT DOCUMENTS

| EP | 2607183 A1 * | 6/2013 | ............. B60R 21/36 |
| WO | WO-2013099481 A1 * | 7/2013 | ........... B60R 21/232 |

* cited by examiner

*Primary Examiner* — Keith J Frisby
(74) *Attorney, Agent, or Firm* — Tarolli, Sundheim, Covell & Tummino L.L.P.

(57) ABSTRACT

A method for manufacturing a one-piece woven (OPW) air bag includes providing yarns and warping the yarns on at least one beam of a loom. Yarns are simultaneously woven into a fabric air bag structure having two layer portions defining both an inflatable volume and non-inflatable portions and single layer portions forming seams delimiting the inflatable volume. The air bag structure is cut to define the OPW air bag and at least one opening extending through only one layer of the two layer portions.

11 Claims, 8 Drawing Sheets

ONE-PIECE WOVEN OCCUPANT RESTRAINT SYSTEM

TECHNICAL FIELD

The present invention relates generally to an apparatus for helping to protect an occupant of a vehicle. More particularly, the present invention relates to a one-piece woven (OPW), inflatable air bag and a method of manufacturing the same.

BACKGROUND OF THE INVENTION

It is known to inflate an occupant restraint system to help protect a vehicle occupant in the event of a vehicle collision. Examples of occupant restraint systems include driver and passenger frontal air bags, side air bags, curtain air bags, inflatable seat belts, inflatable knee bolsters, and inflatable head liners.

Occupant restraint systems can have a variety of constructions. For example, an occupant restraint system can be constructed of overlying woven panels that are interconnected by means, such as stitching or ultrasonic welding, to form connections or seams that help define an inflatable volume of the protection device. As another example, an occupant restraint system can have an OPW construction in which overlying panels are woven simultaneously. The panels are woven together to form connections or seams that help define an inflatable volume of the OPW protection device.

Currently manufactured OPW are first laser cut from unrolled sheets. A separate operation is then used to cut one or more holes or openings in one side of the OPW air bag configured to receive, for example, mounting structure, the inflator, etc.

SUMMARY OF THE INVENTION

According to one example, a method for manufacturing a one-piece woven (OPW) air bag includes providing yarns and warping the yarns on at least one beam of a loom. Yarns are simultaneously woven into a fabric air bag structure having two layer portions defining both an inflatable volume and non-inflatable portions and single layer portions forming seams delimiting the inflatable volume. The air bag structure is cut to define the OPW air bag and at least one opening extending through only one layer of the two layer portions.

In another example, a method for manufacturing an OPW air bag includes providing yarns and warping the yarns on at least one beam of a loom. Yarns are simultaneously woven into a fabric air bag structure having two layer portions defining both an inflatable volume and non-inflatable portions and single layer portions forming seams delimiting the inflatable volume. The air bag is coated. The coated air bag structure is laser cut at a first intensity to define the OPW air bag. At least one opening extending through the coating and only one layer of the two layer portions is laser cut at a second intensity less than the first intensity.

In another aspect, taken alone or in combination with any other aspect, the step of cutting comprises laser cutting the air bag structure and the at least one opening.

In another aspect, taken alone or in combination with any other aspect, the laser is operated at a first intensity to define the OPW air bag and at a second intensity less than the first intensity to define the at least one opening.

In another aspect, taken alone or in combination with any other aspect, the second intensity is less than about 70% of the first intensity.

In another aspect, taken alone or in combination with any other aspect, the laser cuts through a coating provided on the air bag to define the at least one opening.

In another aspect, taken alone or in combination with any other aspect, an inflator is inserted through the at least one opening to place the inflator and the inflatable volume in fluid communication with one another.

In another aspect, taken alone or in combination with any other aspect, a mounting tab is inserted through the at least one opening for securing the air bag to a vehicle side structure.

In another aspect, taken alone or in combination with any other aspect, a fastener is inserted through the at least one opening for securing the air bag to a vehicle side structure.

In another aspect, taken alone or in combination with any other aspect, the air bag structure forms a curtain air bag.

Other objects and advantages and a fuller understanding of the invention will be had from the following detailed description and the accompanying drawings.

DETAILED DESCRIPTION

The present invention relates generally to an apparatus for helping to protect an occupant of a vehicle. More particularly, the present invention relates to an OPW, inflatable air bag and a method of manufacturing the same.

Figure 1A:
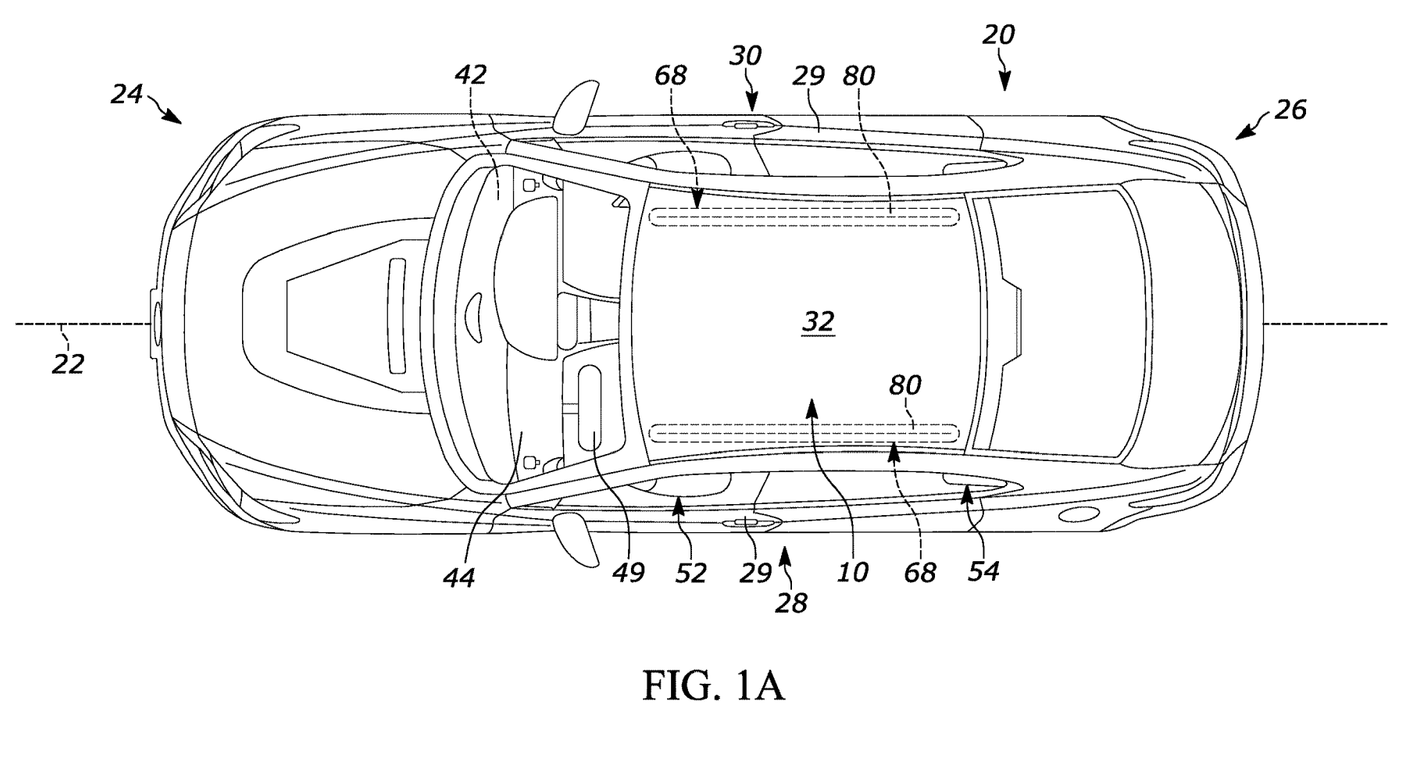
FIG. 1A is a schematic illustration of an example occupant restraint system comprising a curtain air bag in a stored condition in a vehicle roof.
Figure 1B:
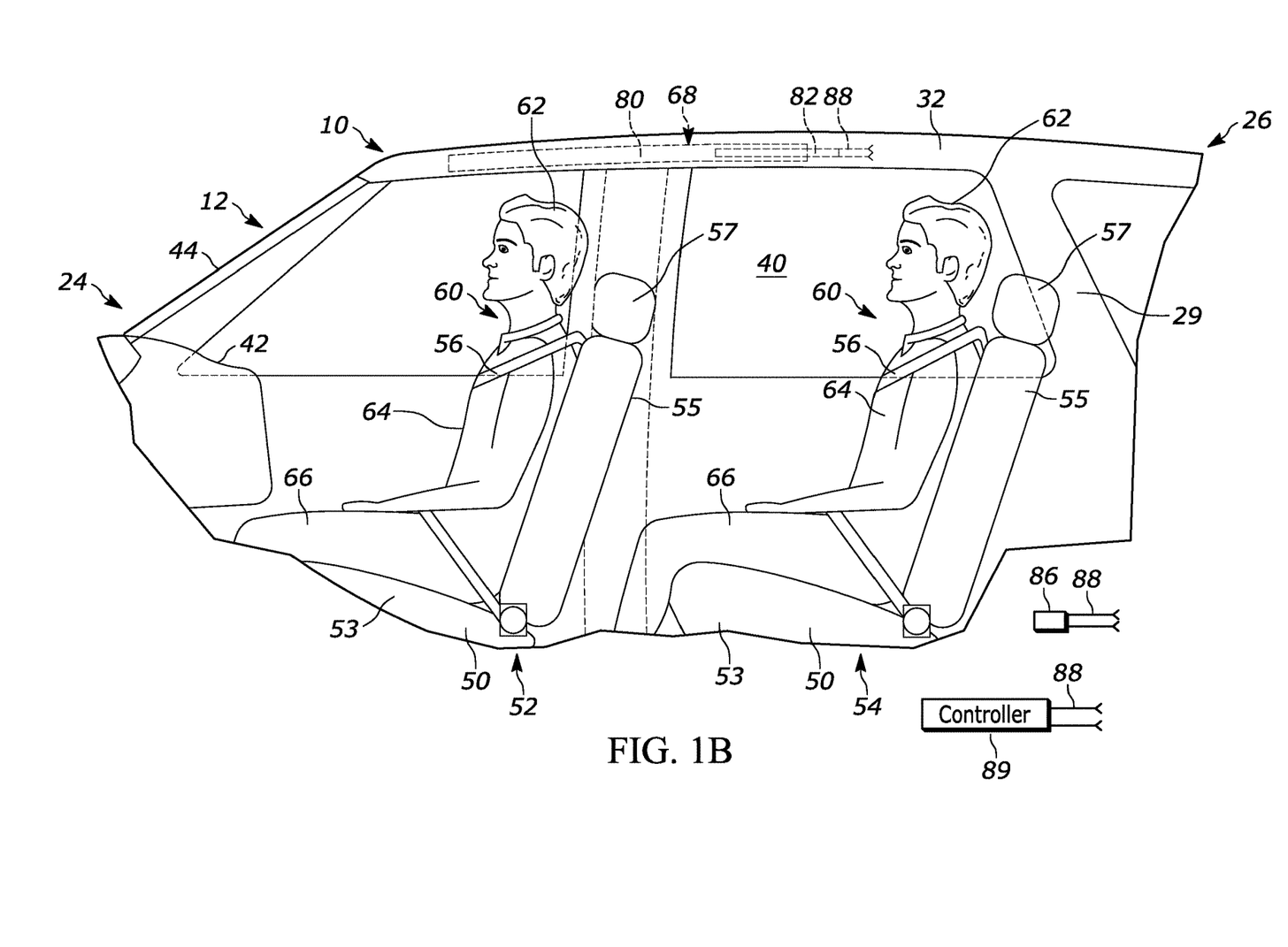
FIG. 1B is a side view of the curtain air bag in the stored condition.
Figure 2:
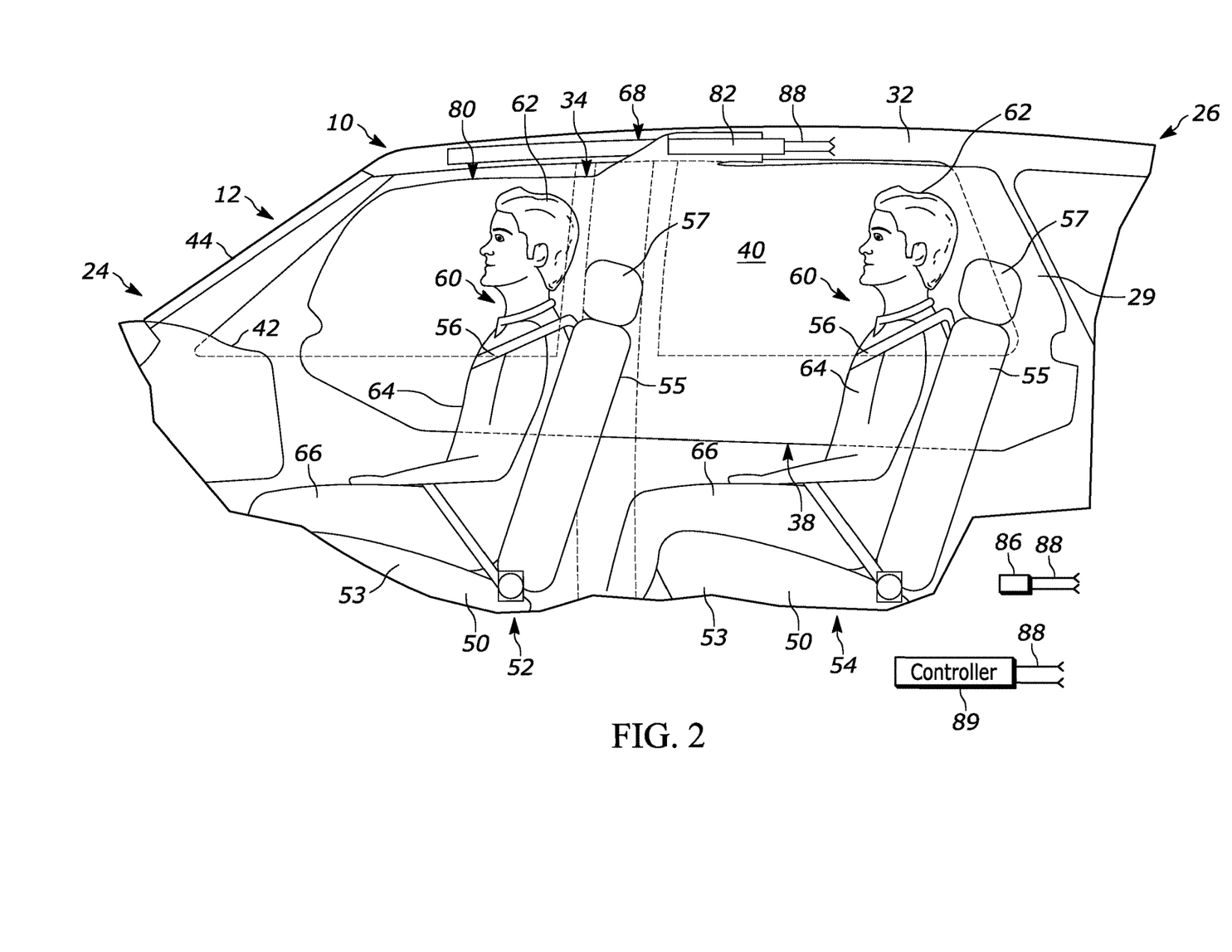
FIG. 2 is a side view of the curtain air bag in a deployed condition.

FIGS. 1A-2 illustrate an example configuration of an apparatus 10 or occupant restraint system for helping to protect one or more occupants 60 of a vehicle 12. As shown in FIG. 1A, the vehicle 12 extends along a centerline 22 from a first or fore end 24 to a second or aft end 26. The vehicle 12 extends to a left/driver side 28 and a right/passenger side 30 on opposite sides of the centerline 22. Each side 28, 30 includes side structure 29 including an A-pillar, a B-pillar, a C-pillar, and doors connected to the pillars.

Referring to FIG. 1A, the first end 24 of the vehicle 12 includes an instrument panel 42 facing a passenger compartment or cabin 40. A windshield or windscreen 44 is located between the instrument panel 42 and a roof 32. The vehicle 12 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40. In the example shown, a steering wheel 49 extends from the instrument panel 42.

Seats 50 are positioned in the cabin 40. In this open passenger cabin 40 configuration, the vehicle seats 50 can be configured, positioned, and oriented in a variety of manners, not constrained by the need to facilitate a vehicle driver/operator. For example, in FIG. 1B, the seats 50 can be arranged in front and rear rows 52 and 54, respectively, oriented in a forward-facing manner similar to that of conventional automobiles. It will be appreciated that the vehicle 12 could alternatively include more or fewer rows of seats 50 (not shown). In any case, a seatbelt 56 is associated with each seat 50 for restraining an occupant 60 in that seat.

Each seat 50 includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60.

The apparatus 10 can be configured for deployment in any known location of the vehicle, e.g., steering wheel, door, front seat, roof, etc. To this end, the apparatus 10 can be include, for example, a center side air bag, side impact air bags, inflatable seat belts, inflatable knee bolsters, and/or inflatable head liners. The apparatus 10 can therefore be used to protect the driver and/or any number of passengers in the vehicle 12.

In the example shown, the apparatus 10 includes an inflatable vehicle occupant protection device in the form of an inflatable curtain airbag 80. The air bag 80 has a stored condition, shown in FIG. 1B, in which the deflated curtain is rolled, folded, or rolled and folded, and positioned adjacent the intersection of a side structure 29 and the roof 32 on the passenger side 30 of the vehicle 12. Alternatively or additionally, the apparatus 10 can include an inflatable curtain airbag 80 on the driver side 28 of the vehicle 12. With this in mind, although the air bags 80 on the respective driver side 28 and passenger side 30 are similar the construction and operation of only the air bag on the passenger side and associated with the passenger seats 50 is discussed for brevity.

That said, the air bag 80 is inflatable from the stored condition in a direction away from the roof 32 to a deployed condition shown in FIG. 2. In the deployed condition, the inflated curtain 80 extends along the side structure 29 and is positioned between the side structure and any passenger side 30 occupants 60 of the vehicle 12. The deployed, inflated curtain 80 extends from an upper end 34 positioned adjacent the roof 18 to a lower end 38 positioned adjacent the torso of the occupants 60.

An inflator 82 is fluidly connected with the air bag 80 and provided with the air bag in a cover or housing/module 68 that is positioned in the roof 32. The inflator 82 can have a known construction suitable for inflating the air bag 80. For example, the inflator 82 can contain a stored quantity of pressurized inflation fluid (not shown) in the form of a gas for inflating the air bag 80. Alternatively, the inflator 82 can contain a combination of pressurized inflation fluid and ignitable material for heating the inflation fluid, or can be a pyrotechnic inflator that uses the combustion of gas-generating material to generate inflation fluid. As a further alternative, the inflator 82 can be of any suitable type or construction for supplying a medium for inflating the air bag 80. In any case, the inflator 82 includes openings (not shown) through which inflation fluid is directed into the air bag 80.

The vehicle 12 includes one or more sensors 86 for sensing the occurrence of an event for which inflation of the air bag 80 is desired. Examples of such events include a vehicle impact, e.g., front, rear, side, offset, or angled impacts, a vehicle rollover, or both. Upon sensing the event, the sensor provides electrical signal(s) over lead wires 88 to the inflator 82 (or a controller 89 connected thereto), which causes the inflator to be actuated in a known manner and discharge fluid under pressure into the air bag 80.

The air bag 80, when inflated, helps protect the passenger side 30 occupant(s) 60 in the event of an impact to the vehicle 12, a vehicle rollover, or both. The air bag 80, when inflated, also helps absorb the energy of impacts with the air bag and helps distribute the impact energy over a large area thereof.

Figure 3:
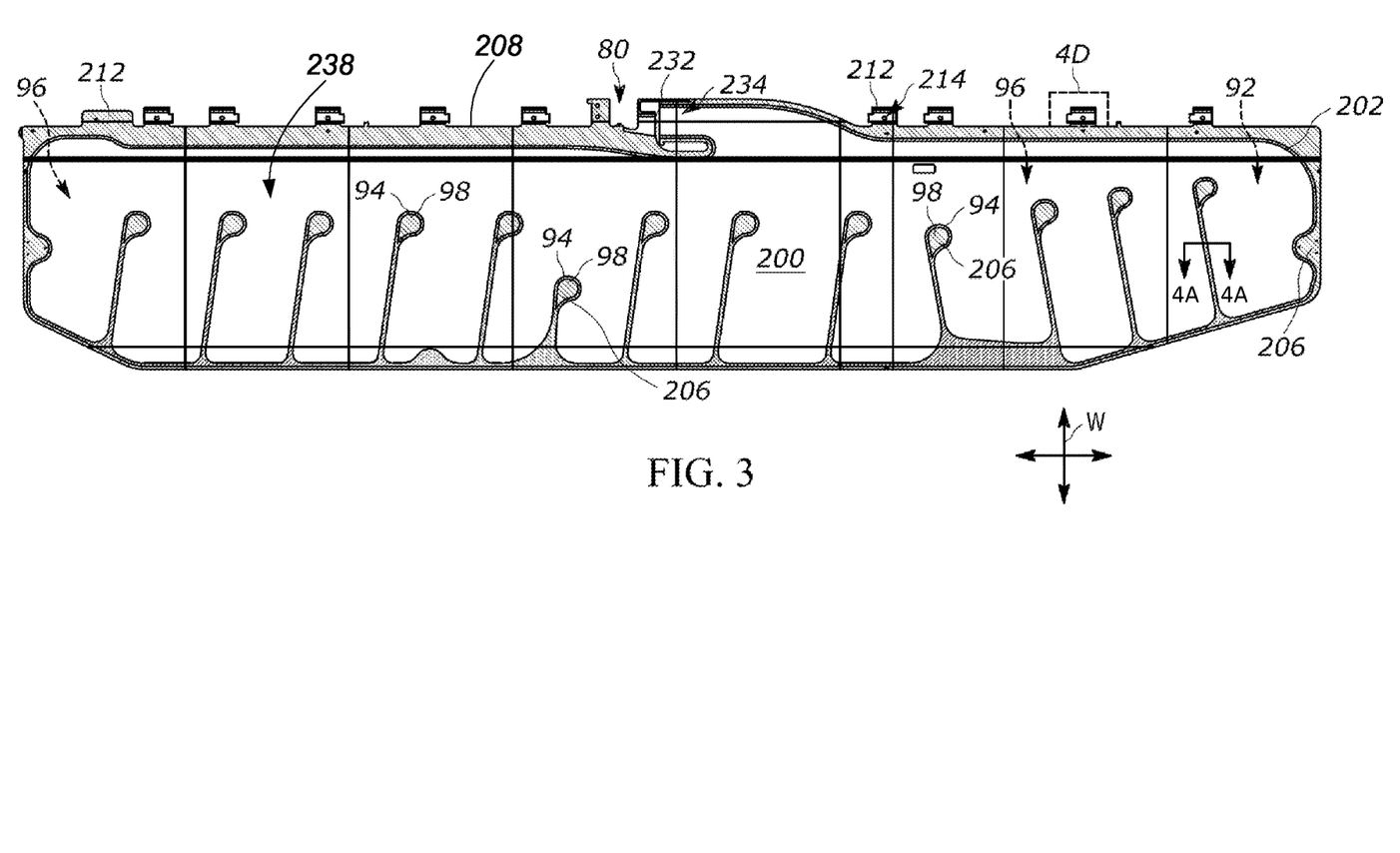
FIG. 3 is a side view of a fabric structure for forming the curtain air bag.

Referring to FIG. 3, in this example configuration, the air bag 80 includes integrally formed panels 90 that cooperate to define an inflatable volume 92. Seams 94 extending along the panels 90 help define inflatable chambers 96 within the inflatable volume 92 and non-inflatable portions 98. The air bag 80 has an OPW construction in which the air bag is a single, unitary, woven article with portions, i.e., the panels 90, woven simultaneously as separate, spaced apart layers of material, and portions, i.e., the seams 94, woven as a single layer (i.e., not layers spaced apart from one another). The OPW construction can be especially beneficial in an air bag construction because this construction can afford long duration inflation and high pressurization capabilities, which can be desirable for curtain air bags and other types of air bags.

The particular OPW configuration of the air bag 80 is by way of example only. The present invention is suited for implementation in OPW air bag structures having any configuration, e.g., multiple inflatable portions, a single inflatable portion, no inflatable portions, and any number of seams, including zero. That said, the air bag 80 has an OPW construction that promotes seam integrity, easier and more compact packaging, and uniform shrinkage in the weft direction. To accomplish this, the OPW construction of the air bag 80 is configured such that certain portions of the air bag are woven with different weave patterns. In describing the air bag 80, reference is made to its a length, which is measured in a warp direction (left to right as viewed in FIG. 3), and its width, which is measured perpendicular to the length and in a weft direction (top to bottom as viewed in FIG. 3). That said, the weave direction of the air bag 80 yarns is indicated at W.

Figure 4A:
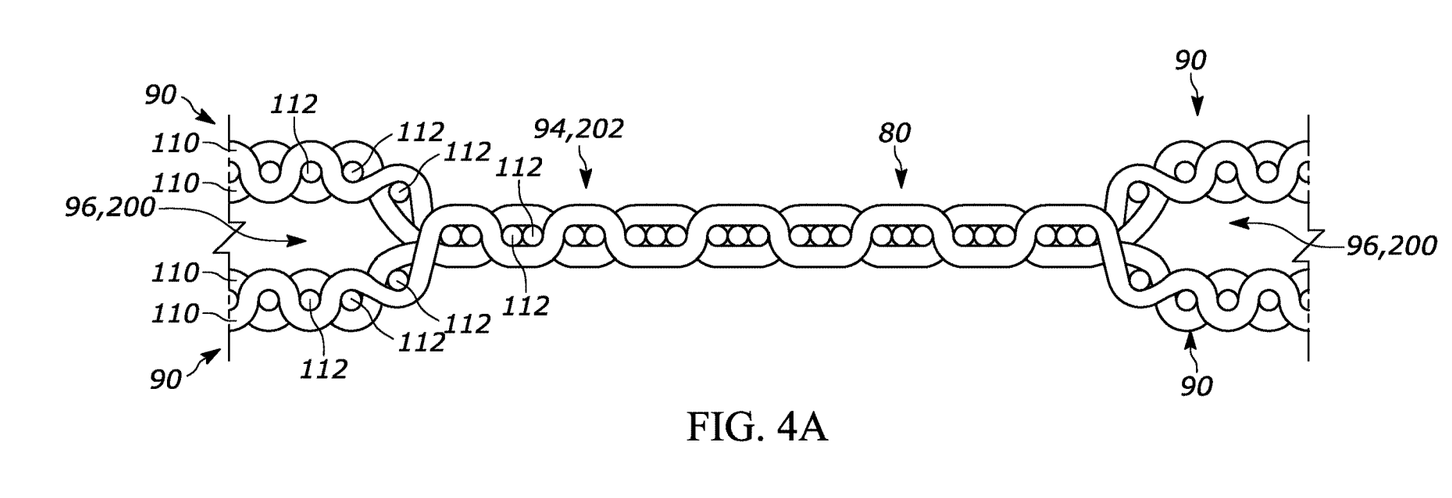
FIG. 4A is a sectional view taken generally along line 4A-4A in FIG. 3 illustrating the weave of a first portion of the fabric structure.

Referring to FIG. 4A, the panels 90 each includes a plurality of warp yarns, or "ends", indicated at 110. The panels 90 also each includes a plurality of weft yarns, or "picks," indicated at 112. The warp yarns 110 and the weft yarns 112 are oriented perpendicular to each other. The warp yarns 110 are interlaced with the weft yarns 112 in an alternating or "up and down" fashion.

In the inflatable areas 96, 200, each panel 90 is woven in a one-by-one (1×1) weave pattern referred to in the art as a "plain weave" pattern. Every other warp yarn is used to form the upper layer with their adjacent warp yarns always in the down position as a single weft yarn is inserted (e.g., 1 up and 2, 3, 4 down). The second weft yarn is then inserted to form the lower layer. In this case the warp yarns used for the upper layer are always in the up position and their adjacent yarns form the lower layer (e.g., 1, 2, 3 up and 4 down). The third weft yarn is then inserted to form the upper layer in this case (e.g., 3 up and 1, 2, 4 down) and the fourth weft yarn back to the lower layer in this case (e.g., 4 up and 1, 2, 3 down). This combination is then repeated. In this example, all odd number warp and weft yarns form the upper panel and all even number warp and weft form the lower panel. This is referred to in the art as a double layer plain weave.

Weave patterns include what are referred to in the art as "floats." A "float" refers to the number of adjacent warp yarns 110 or weft yarns 112 that a weft yarn or warp yarn, respectively, extends over or under. The number of floats in a woven fabric varies with the particular type of weave with which the fabric is woven. For example, a plain woven fabric includes single floats because the warp and weft yarns pass over and under single weft and warp yarns, respectively. As another example, a 2×2 woven fabric includes two floats because the warp yarns and weft yarns pass over and under two adjacent weft and warp yarns, respectively.

The seams 94 have constructions that vary from the plain weave pattern in order to provide a desired function for the particular seam. In the portion illustrated in FIG. 3, the seam 94 has a non-plain, two-by-two (2×2) followed by a three-by-three (3×3) weave pattern, hereafter referred to as a low float weave pattern. Low float weave patterns are shown and described in U.S. Patent Publication No. 2006/0236403, the entirety of which is incorporated herein by reference. It will be appreciated, however, that the seam 94 can have an alternative non-plain weave pattern, examples of which are noted below.

In areas of a fabric where different weave patterns interface with each other floats in addition to those normally occurring in the weave patterns may occur. This is especially relevant in an OPW air bag design where a double layer plain weave interfaces with a non-plain weave pattern, e.g., at the transitions between the inflatable chambers 96 and the seam 94. The number and location of these excess floats is determined by the weave pattern of the fabric at the interface. While the existence of excess floats at the interface may be unavoidable, the weave pattern may be configured, to a large extent, to help place a desired number of floats in a desired location at the interface between the weave patterns.

In the example configuration, the air bag 80 includes both plain woven portions and non-plain woven portions. Portions 200 of the air bag 80 (indicated without cross-hatching) identify portions of the woven panels 90 woven in separate layers with a plain weave. Portions identified by cross-hatching at 202 of the air bag 80 identify portions of the woven panels 90 woven together with the low float weave pattern to help form the seams 94 of the air bag 80. The portions 202 forming the seams 94 can have alternative weave patterns, one or more of: a 3×3 panama weave pattern, an alternative basket weave pattern and/or a weave repeat pattern.

A portion identified by cross-hatching at 206 extends around the entire periphery 208 of the air bag 80 and identifies portions of the panels 90 woven together with a BST 99 weave pattern. One or more portions 206 can also be provided interior of the periphery 208. The portions 206 are single layer/non-inflated portions.

Returning to FIG. 3, portions identified by cross-hatching at 212 of the air bag 80 are provided along the top of the periphery 208. Each portion 212 includes one or more openings 214 that receive fasteners (not shown) to help secure the air bag 80 to, for example, the roof 32 and/or to the side structure 29, e.g., to the A-pillar. The portions 212 identify portions of the panel 90 woven with a panama weave pattern, e.g., a 4×3×4×3 panama weave pattern. The portions 212 are single layer, non-inflated portions.

The plain woven and non-plain woven portions of the panels 90 can have different gas permeabilities. For example, the non-plain woven portions can have a higher gas permeability than the plain woven portions due to the looser weave and higher propensity for yarn shifting in the non-plain weave. To this end, an outer coating and/or lamination 238 can be applied to the panels 90 to help control the gas permeability of the panels and maintain the gas permeability of the panels at a desired level.

The coating 238 can be any coating suited to provide desired permeability characteristics. For example, the coating 238 can comprise a gas impermeable or substantially gas impermeable urethane or silicone material. In any case, the air bag 80 can thus maintain the improved seam integrity and packaging provided by the plain and non-plain woven portions described above without sacrificing gas permeability.

Figure 4B:
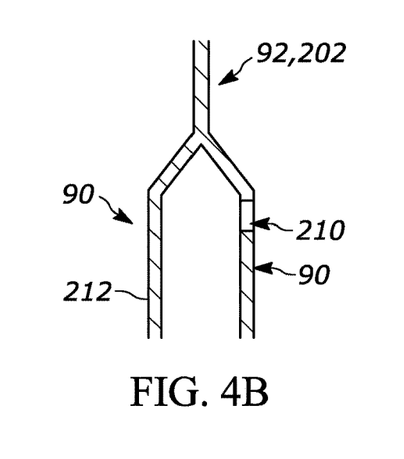
FIG. 4B is a schematic illustration of a single layer opening formed in a first side of the fabric structure.
Figure 4C:
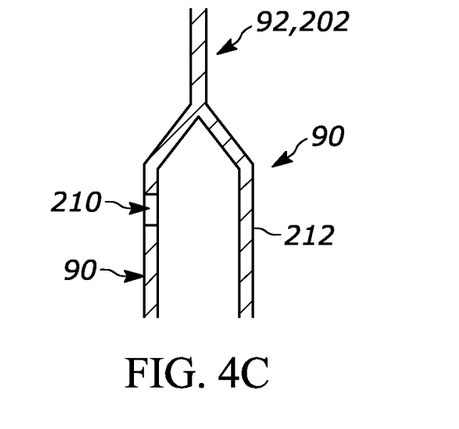
FIG. 4C is a schematic illustration of a single layer opening formed in a second side of the fabric structure.

Referring to FIGS. 4B-4C, one or more openings 210 can be formed in the air bag 80 for receiving various structures, e.g., fasteners, mounting brackets or tabs, the inflator 82, etc., needed to secure the air bag to the vehicle 20 and inflate/deploy the air bag. More specifically, an opening 210 can be formed in either the first panel 90 (right as shown in FIG. 4B) or second panel 90 (left as shown in FIG. 4C) to enable a bracket, tab, inflator, etc. to extend between the panels. The openings 210 are cut into each panel 90 in a manner that does not also cut the other, opposing panel.

Figure 4D:
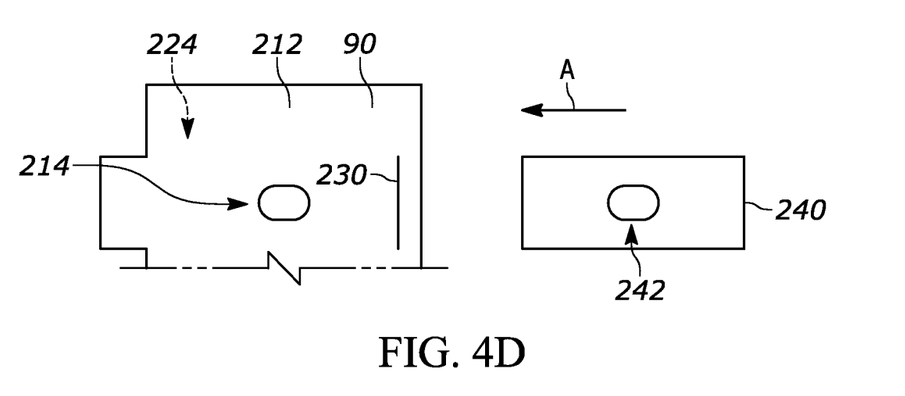
FIG. 4D is an enlarged view of a portion of FIG. 3.

In one example shown in FIG. 4D, an opening (indicated at the cut line 230) is formed in one of the panels 90 on one of the portions 212 along the top of the periphery. The opening 230 allows a mounting tab 240 having an opening 242 to be inserted between the panels 90 in the manner A into a space 224 therebetween. When this occurs, the opening 242 is aligned with the opening 214 in the portion 212. Consequently, an operator/installer can simply insert the mounting tab 240 through the opening 230 and into the space 224 and thereafter extend a fastener (not shown) through the aligned openings 214, 242 to help secure the air bag 80 to the vehicle 12. This process can be repeated for any and all portions 212 that are intended to receive brackets or tabs.

In another example shown in FIG. 3, an opening (indicated at the cut line 232) is formed in one of the panels 90 in a portion 234 of the air bag 80 where the inflator 82 establishes fluid communication with the inflatable volume 92. In other words, the opening 232 can be formed in the portion 234 to enable the inflator 82 to extend through one of the panels 90 and into the inflatable volume 92.

Figure 5:
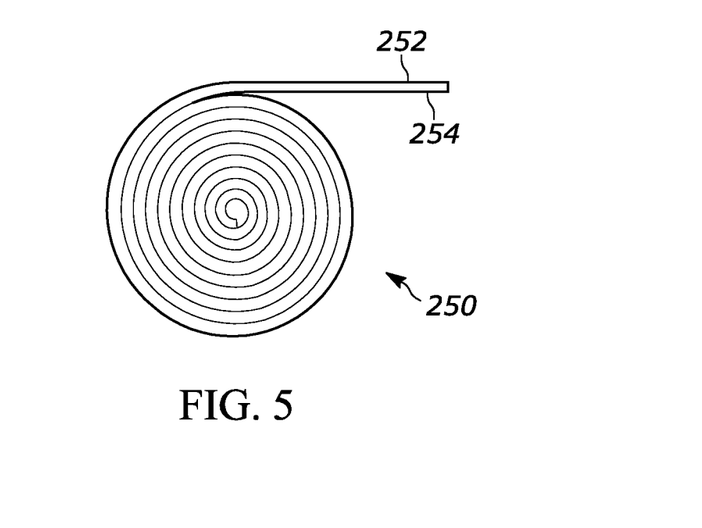
FIG. 5 is a side view of a roll of fabric material for forming the fabric structure of FIG. 3.

The panels 90 used to construct the air bag 80 are formed in a continuous roll of fabric material 250, shown in FIG. 5 (rolled). The weave patterns used to weave the panels 90 are selected to promote processing the woven roll 250 of material. Once the roll 250 is produced and any coating(s) applied, the panels 90 are cut out from the roll to define the air bag 80. More specifically, the (border) is cut entirely through to completely separate each air bag 80 from the unfurled roll 250. This cutting can be performed by cutting machines, such as the laser 270 shown in FIG. 6, that use vision systems to help improve cutting accuracy.

Figure 6:
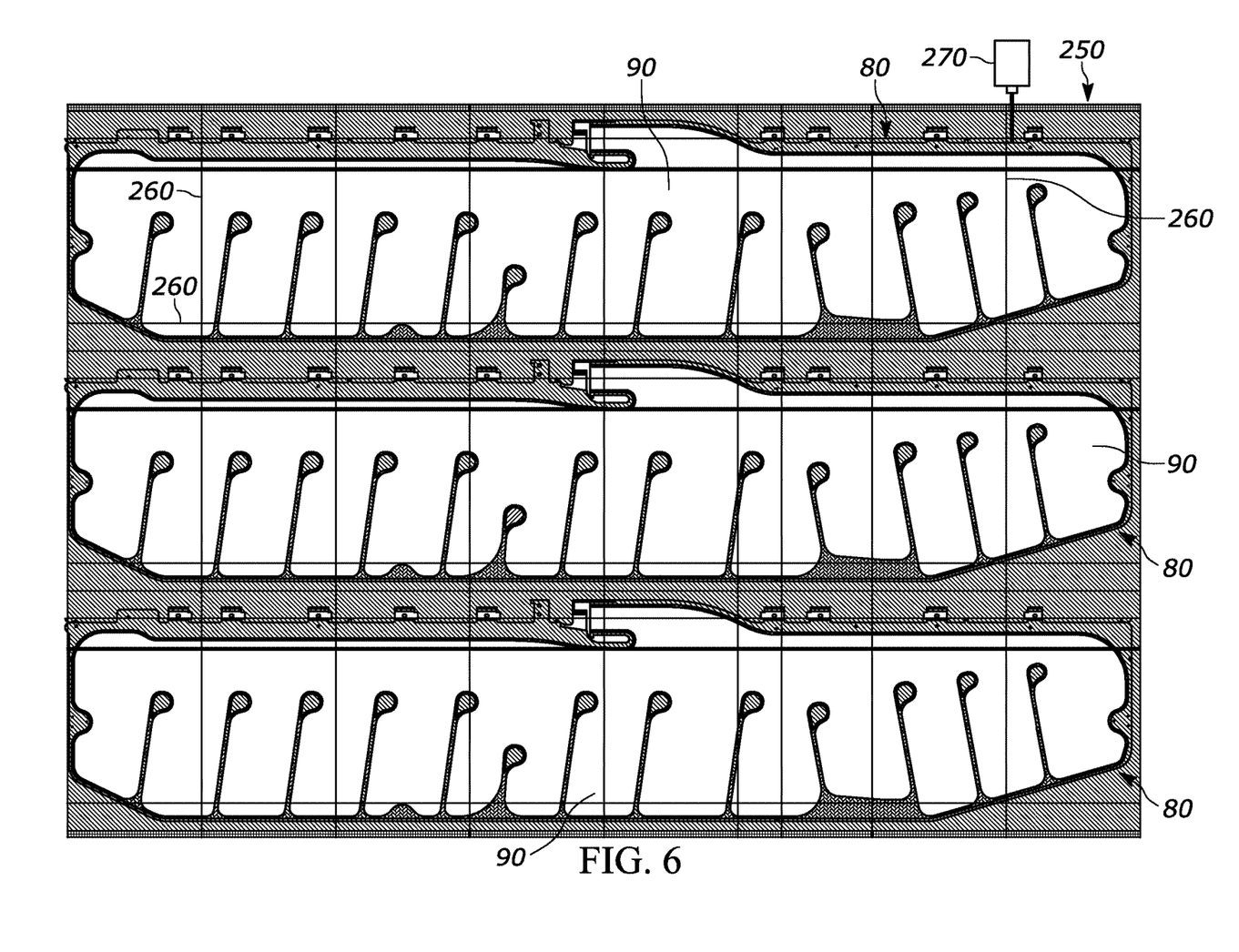
FIG. 6 is a schematic illustrating a cutting process for forming the curtain air bag.

Advantageously, at the same time, any openings 230, 232 in the air bag 80 are also cut through only one panel 90 in portions where two panels are present/spaced apart. With this in mind, the laser 270 can be operated at a first intensity while cutting the air bags 80 from the roll 250 sufficient to cut through both panels 90 and separate the air bag from the roll. The laser 270 can then be operated at a second intensity less than the first intensity, e.g., about 80% of the first intensity, in order to cut through only one of the panels 90 and cut the openings 230, 232 where desired. It will also be appreciated that the laser 170 can be operated at different speeds, e.g., about 1.5 m/s during normal (2-layer) cutting and about 0.9 m/s during the (single layer) hole-cutting process. In one example, the laser is a $CO_2$ laser with an output of up to about 2000 W.

Figure 7:
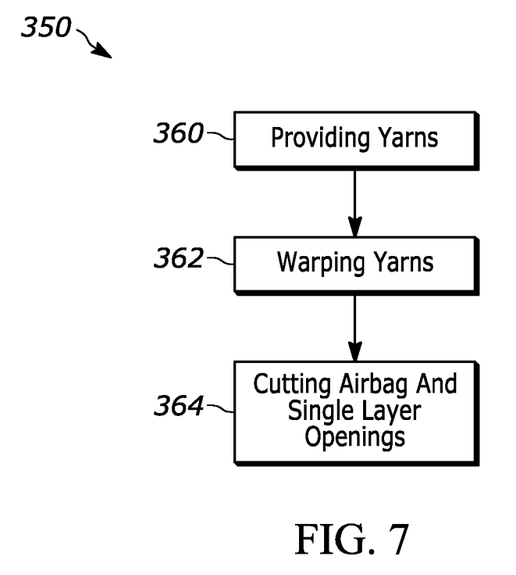
FIG. 7 is a flow chart illustrating a method of forming the air bag of FIG. 3.

In one example method 350 for forming the air bag 80 shown in FIG. 7, at step 360 yarns are provided. At step 362, the yarns are warped on at least one beam of a loom, e.g., an air-jet loom or rapier loom. The warped yarns are then woven on the loom to form the roll 250 having an OPW construction. At step 364, the coated roll 250 is cut to the pattern shown in FIG. 3 to define the air bag 80 while also adjusting (reducing) the laser 270 intensity accordingly to cut the single layer openings 230, 232 in the air bag.

The cutting process used herein can be used to cut openings anywhere in the OPW air bag where the panels/layers need to be separated in order to insert another object between the layers/panels, e.g., an opening for the inflator, hanging tab, mounting brackets, and/or for an anti-twist spline extending the length of the air bag. The cutting process can also be advantageous where an object is to be inserted between two fused layers of the air bag, e.g., a steel clip or one-piece bracket. Stud holes can also be cut with the laser.

It will be appreciated that when the air bag is coated, the cutting process shown and described herein helps to avoid fusing the coating to itself around the cut openings because the intensity used to form those openings is reduced, i.e., not sufficiently high to melt/reflow the coating.

The hole/opening cutting process of the present invention is advantageous in that it reduces the number of steps and cost associated with forming OPW air bag including structure-receiving openings. More specifically, the present invention combines the steps for cutting the air bag from the unrolled roll with forming the desired structure-receiving opening(s) in the cut air bag. That said, the same laser used to cut the individual air bags from the roll can also be used to cut any single layer opening(s) in the air bag by simply adjusting the laser intensity and/or speed. Consequently, this process is more efficient, less costly, and more precise than using one separate, distinct process for cutting the air bag and another separate, distinct process to form the openings for the mounting tabs, inflator, etc.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations.

Having described the invention, the following is claimed:

1. A method for manufacturing a one-piece woven (OPW) air bag, comprising:
    providing yarns;
    simultaneously weaving yarns into a fabric air bag structure having two layer portions defining both an inflatable volume and non-inflatable portions and single layer portions forming seams delimiting the inflatable volume; and
    cutting the air bag structure to define the OPW air bag and at least one opening extending through only one layer of the two layer portions, wherein the step of cutting comprises cutting with a laser the air bag structure and the at least one opening, and wherein the laser is operated at a first intensity to define the OPW air bag and at a second intensity less than the first intensity to define the at least one opening.

2. The method of claim 1, wherein the second intensity is less than about 70% of the first intensity.

3. The method of claim 1, wherein the laser cuts through a coating provided on the air bag to define the at least one opening.

4. The method of claim 1, further comprising inserting an inflator through the at least one opening to place the inflator and the inflatable volume in fluid communication with one another.

5. The method of claim 1, further comprising inserting a mounting tab through the at least one opening for securing the air bag to a vehicle side structure.

6. The method of claim 1, wherein the air bag structure forms a curtain air bag.

7. A method for manufacturing a one-piece woven (OPW) air bag, comprising:
    providing yarns;
    simultaneously weaving yarns into a fabric air bag structure having two layer portions defining both an inflatable volume and non-inflatable portions and single layer portions forming seams delimiting the inflatable volume;
    coating the air bag;
    laser cutting the coated air bag structure at a first intensity to define the OPW air bag; and
    laser cutting at least one opening extending through the coating and only one layer of the two layer portions at a second intensity less than the first intensity.

8. The method of claim 7, wherein the second intensity is less than about 70% of the first intensity.

9. The method of claim 7, further comprising inserting an inflator through the at least one opening to place the inflator and the inflatable volume in fluid communication with one another.

10. The method of claim 7, further comprising inserting a mounting tab through the at least one opening for securing the air bag to a vehicle side structure.

11. The method of claim 7, wherein the air bag structure forms a curtain air bag.

* * * * *